(12) United States Patent
Schwindt (10) Patent No.: US 8,636,097 B2
(45) Date of Patent: *Jan. 28, 2014

(54) GAS SUSPENSION SYSTEM

(71) Applicant: Jeffrey R. Schwindt, Indianapolis, IN (US)

(72) Inventor: Jeffrey R. Schwindt, Indianapolis, IN (US)

(73) Assignee: Airfx, LLC

( * ) Notice: Subject to any disclaimer, the term of this patent is extended or adjusted under 35 U.S.C. 154(b) by 0 days.

This patent is subject to a terminal disclaimer.

(21) Appl. No.: 13/647,925

(22) Filed: Oct. 9, 2012

(65) Prior Publication Data

US 2013/0093158 A1    Apr. 18, 2013

Related U.S. Application Data

(63) Continuation-in-part of application No. 12/869,415, filed on Aug. 26, 2010, now Pat. No. 8,316,978.

(51) Int. Cl.
*B62D 61/02*    (2006.01)

(52) U.S. Cl.
USPC .......................................................... 180/219

(58) Field of Classification Search
USPC ............................ 180/219, 227; 280/275, 283
See application file for complete search history.

(56) References Cited

U.S. PATENT DOCUMENTS

| | | | | |
|---|---|---|---|---|
| 4,735,276 A * | 4/1988 | Burton | ........................... | 180/219 |
| 6,105,988 A * | 8/2000 | Turner et al. | ................... | 280/276 |
| 6,533,305 B1 * | 3/2003 | Falk | .............................. | 280/276 |
| 6,688,626 B2 * | 2/2004 | Felsl et al. | ..................... | 280/275 |
| 6,871,718 B2 * | 3/2005 | McGuire | ....................... | 180/210 |
| 2003/0141678 A1 * | 7/2003 | McGuire | ..................... | 280/5.515 |
| 2003/0234144 A1 * | 12/2003 | Fox | ................................ | 188/278 |
| 2007/0090624 A1 * | 4/2007 | Chen | .............................. | 280/276 |

* cited by examiner

*Primary Examiner* — Tashiana Adams (57) ABSTRACT

A suspension system for use with a motorcycle includes a single body having two pneumatic cylinders in axial alignment therein. The suspension system may be sold in a kit, and may be installed in an existing front wheel fork.

20 Claims, 7 Drawing Sheets

Fig. 1

Prior Art

GAS SUSPENSION SYSTEM

CROSS-REFERENCE TO RELATED APPLICATIONS

This application is a continuation-in-part of U.S. Ser. No. 12/869,415, filed Aug. 26, 2010, which is a continuation-in-part of U.S. Ser. No. 11/530,900, filed Sep. 12, 2006, which is expressly incorporated by reference herein.

BACKGROUND AND FIELD OF INVENTION

This invention generally relates to vehicle suspension systems. More particularly, in an illustrated embodiment, the invention is directed to air suspension systems for motorcycle suspensions.

In general terms, motorcycles typically include a main frame to which the engine is attached. One or more sub-frames or support-like elements can be movably attached to the main frame, each of which can be adapted to hold one of the motorcycle wheels. The moving sub-frames may permit the motorcycle front and rear wheels to move relative to the main frame. A suspension system may also be used to maintain the height of the motorcycle.

Traditionally, motorcycle suspension systems for street bikes have included one or more springs (typically coil springs) and a hydraulic damper unit applied to each of the front and rear wheel to provide the lift and dampening needed to suspend the vehicle and control movement of the wheels during compression and rebound of the wheels. Such a spring and damper unit may be fastened between a swing arm and main frame in the rear of the motorcycle to control the rear wheel assembly and associated parts. Also, a spring and damper unit may be positioned inside a telescoping fork assembly to control the front wheel. Another form of a front fork, referred to as a "springer" fork, includes a spring suspension operating between two pairs of parallel fork members in a well known manner.

Other suspension systems may use air in place of or in addition to the spring. These systems are often called air-ride suspension systems, and may use rubber air bags as springs and may further be charged using a compressed air system. Compressed air may be varied to control the ride height and the ride characteristics (i.e. firmness) of the motorcycle. However, the ride will inherently get firmer as the air pressure increases in these systems.

SUMMARY OF INVENTION

The present invention relates to a suspension system having at least one double-acting air cylinder. In one illustrative embodiment, the double acting cylinder is a single cylinder positioned between the front wheel of a motorcycle and the motorcycle main frame. In another embodiment, the double acting cylinder is a single cylinder positioned between the rear wheel of the motorcycle and the motorcycle main frame. In yet another embodiment, two or more cylinders are axially aligned and provide two or more chambers having compressed gas for controlling the suspension characteristics in a motorcycle.

The system disclosed herein could be applied to other vehicles or suspension systems, such as those found in autos and trailers. Accordingly, as referred to herein, the term "motorcycle" and the like may be substituted by "vehicle", "auto", "trailer", or any other use that could incorporate the suspension system disclosed herein. Further features and advantages of the invention will be readily apparent from the specification and from the drawings.

Moreover, although the illustrated embodiments relate to a suspension system for a front wheel, it should be understood that the concepts described herein can be applied to a rear wheel suspension system with few or no modifications, and rear wheel suspension systems are within the scope of the disclosure.

Additional features of the disclosure will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
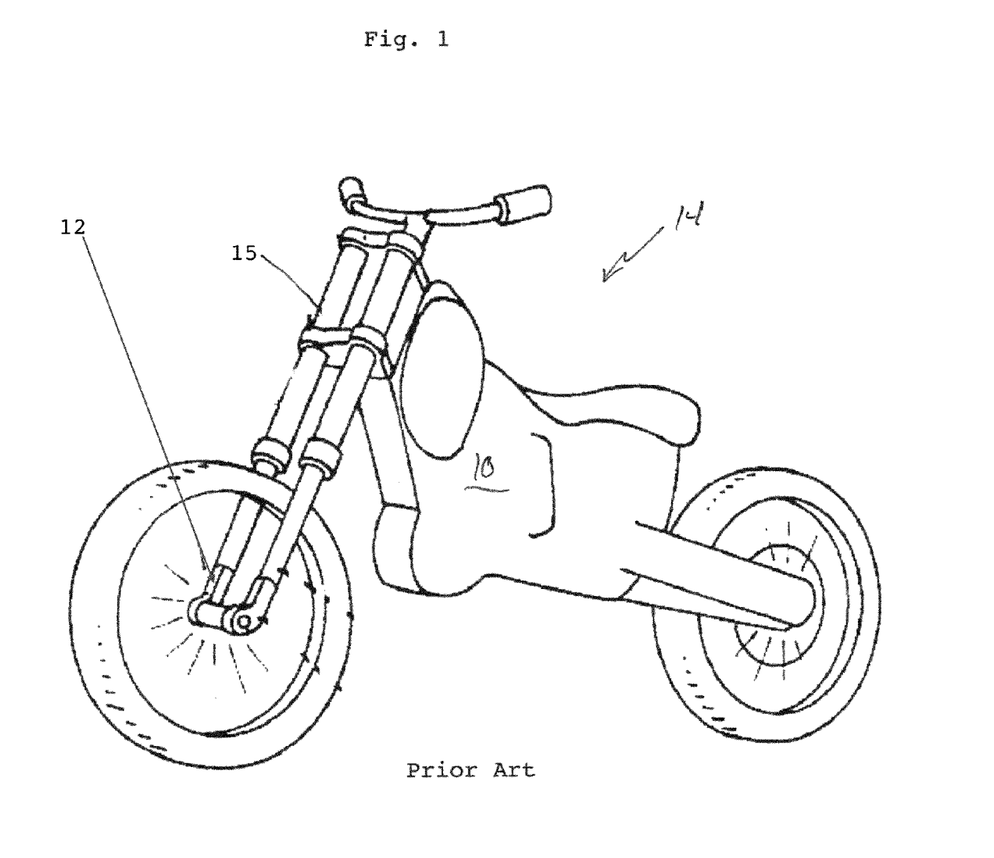
FIG. 1 shows a prior art motorcycle frame and front wheel having a prior art suspension system connected thereto.

FIG. 1 illustrates a well-known main frame 10 and front wheel support 12 for a motorcycle 14. Such a main frame 10 and front wheel support 12 function together in a well known manner and a number of suspension systems have been proposed, designed and marketed which provide suspension functions to the front wheel support 12 of such a motorcycle 14. Generally, the front wheel support 12 is connected to a suspension component 16 that absorbs forces resulting from the front wheel's movement or contact with objects during operation of the motorcycle 14. A suspension component 15 may be coupled to front wheel support 12, or may be connected to and operate between main frame 10 and front wheel support 12 (not shown). In yet another non-illustrated embodiment, suspension component 15 may be connected between main frame 10 and a rear wheel frame.

Figure 2:
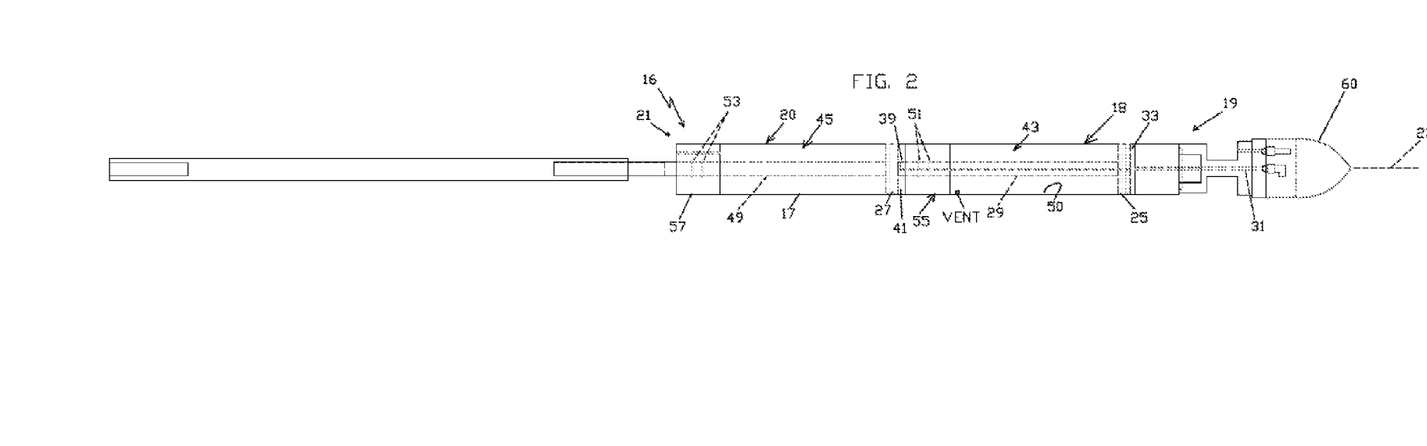
FIG. 2 shows a front view of a gas suspension system according to one embodiment of the present invention.

FIG. 2 shows one embodiment of the proposed suspension component 16, wherein the suspension component includes a housing 17 having a first end 19 and a second end 21. First end 19 is illustratively configured to be connected to the main frame 10 or wheel support 12 of the motorcycle, and second end 21 is illustratively configured to connect to the wheel (either front or rear) support. In the illustrated embodiment, suspension component 16 comprises at least a part of the front suspension assembly of the motorcycle, and compresses and extends to adjust for inconsistencies in the road, allowing the front (or rear) tire to maintain contact with the road for better handling and braking without the rider feeling the up-and-down movement of the wheel.

As can be seen in FIG. 2, two cylinders 18, 20 are housed within housing 17. In such an embodiment, cylinders 18, 20 are arranged coaxially along axis 23 and pistons 25, 27 move axially together relative to housing 17. Suspension component 16 is in pneumatic communication with a pneumatic system (shown in schematic form in FIG. 7) that provides compressed gas to the cylinders 18, 20. In the illustrated embodiment, air is disclosed as the compressed gas. However, it should be understood that the use of other gases is within the scope of the invention.

Housing 17 of suspension component 16 is capable of holding pressurized air. Although the illustrated housing defines a pair of axially aligned air cylinders 18, 20, it is contemplated that other arrangements are possible, and within the scope of the invention. Moreover, it is possible for a single air cylinder 18 to be used, rather than the use of two axially aligned air cylinders.

As shown in FIGS. 2-6, disposed within the air cylinders 18, 20 are pistons 25, 27 respectively, which are sealed (e.g. with bi-directional seals) in the cylinders so as to prevent loss of air pressure. Such pistons are positioned to reciprocate within the cylinder bores. Pistons 25, 27 are connected via piston rod 29. A second rod 49 extends from piston 27 toward and through second end 21. Piston rod 29 and second rod 49 may or may not be directly connected. As shown in the illustrative examples, piston rod 29 connects to one side of piston 27, and second rod 49 connects to an opposite side of piston 27. Double rod seals 51, 53 are shown housed within midsection 55 (shown enlarged in FIG. 4) and end cap 57 (shown enlarged in FIG. 5), respectively.

In the illustrated example, piston rod 29 is a hollow shaft having a channel 37 formed therein. Additionally, a port 31 is positioned at first end 19 for accepting compressed air into the housing 17 and into chamber 33 of cylinder 18. As compressed air fills chamber 33, piston 25 is urged toward midsection 55. As compressed air enters into chamber 33, it will also be directed through channel 37, illustratively bored through the axial center of piston rod 29. This compressed air is then directed through port 39 into chamber 41, providing for simultaneous compression of chambers 33, 41 (referred to herein as "lift" chambers). Non-lift chambers 43, 45 may be filled with a compressed gas or ambient air, as further disclosed below. The resulting effect is that both pistons 25, 27 will be positioned within their respective cylinders 18, 20, and suspended by the compressed air in the lift chambers 33, 41 and non-lift chambers 43, 45. When pressurized air enters lift chambers 33, 41, pistons 25, 27 are forced toward second end 21 of suspension component 16, thereby causing piston rod 29 to extend. Such extension of suspension component 16 can also provide for raising or lowering of the entire motorcycle.

In another embodiment, non-lift chamber 43 is vented to atmosphere, and therefore little to no bias is exerted by non-lift chamber 43.

Figure 7:
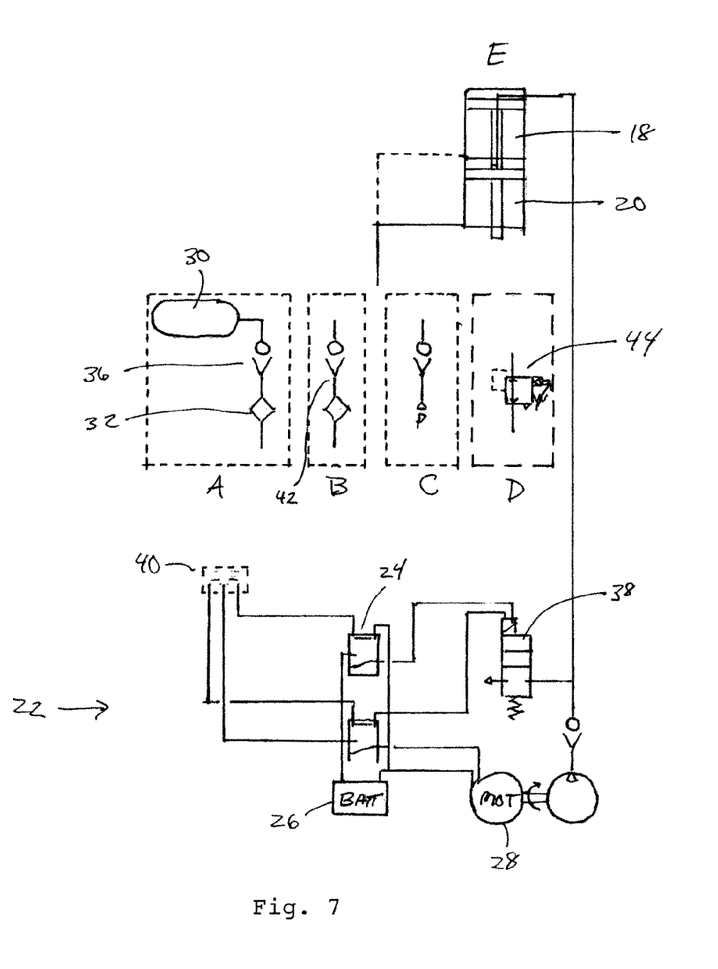
FIG. 7 is a schematic view of the circuit that can be used to operate the gas suspension system of FIGS. 1-6.

Compressed air to suspension component 16 is illustratively provided with a system (and variations) 22 such as that shown in FIGS. 7-7D. As seen in FIG. 7, system 22 comprises a relay 24 connected to a battery 26 (illustratively the motorcycle battery). Closing relay 24 permits electricity from battery 26 to operate an air motor or compressor 28. In one embodiment, the relay 24 is in the same circuit as the ignition switch; therefore, the activation of the ignition switch closes relay 24 and permits operation of compressor 28.

System 22 may be configured such as that shown in FIG. 7A, wherein compressor 28 is configured to supply compressed air to a volume chamber 30. A filter 32 may also be incorporated into system 22 to filter impurities, such as particulate matter and oil. Pressure in volume chamber 30 is set by an operator pressing one of buttons 40 until the desired pressure (and ride characteristics) are achieved. A check valve 36 can be incorporated to retain the air in volume chamber 30. Volume chamber 30 may be a separate chamber or may be part of the motorcycle frame, such that a frame member of the motorcycle functions as a volume chamber and could contain pressurized air.

As shown in FIG. 7, a solenoid valve 38 may be incorporated in system 22. Solenoid 38 permits an operator to dump pressure from the system, thereby softening the ride and/or lowering the ride height for the operator. Furthermore, system 22 could be configured such that compressor 28 will not operate unless the ignition switch is turned to the "lights on" position.

Push buttons 40 can also be provided for controlling the compressed air in the cylinders. Such push buttons 40 may be located in a position convenient to a motorcycle rider, such as near or on the handle bars. The push buttons 40 control the compressed gas pressure in cylinders 18, 20 by either directing additional compressed air to be added to cylinders 18, 20 or bleeding air from cylinders 18, 20. By varying the amount of compressed air in cylinders 18, 20, the ride height, ride quality, and/or spring rate of the cylinders can be modified to the user's liking or needs.

Another embodiment of the invention is shown in FIG. 7B. In such an embodiment, pressure in rebound chambers 43, 45 (visible in FIGS. 2-3) can be controlled simply via a check valve 42, shown in FIG. 7B. Such a check valve 42 would allow for the intake of ambient air into rebound chambers 43, 45 when the system is not energized (i.e. chambers 33, 41 are not energized with compressed air). For example, during the initial installation of the check valve, the initial suspension travel (extension) will suction air through check valve 42 into chamber 45, and the check valve will seat. This air is now trapped and will act as an air spring and biasing element. When the system is later energized, check valve 42 would seal, and rebound chamber 45 would provide an opposing bias as lift chambers 33, 41 are further energized.

For the embodiments disclosed herein, it is possible (and sometimes preferable) for a check valve to be installed on both rebound chambers 43, 45 to trap air. Consequently, either or both rebound chambers 43, 45 could be charged with pressurized air depending on the use or desired suspension qualities. For example, when a firmer ride is desired, both rebound chambers 43, 45 can be charged with compressed gas or air.

In yet another alternative embodiment, shown in FIG. 7C, rebound chambers 43, 45 may be pre-pressurized to a pre-selected level prior to delivery to the consumer. A desirable pre-selected pressurization level has been determined to be approximately three pounds-per-square-inch, but any pressure above zero psi and below 10 psi is contemplated to be within the scope of the invention.

In a further embodiment illustrated in FIG. 7D, pressurized air can be supplied to rebound chambers 43, 45 at a secondary pressure to offset the primary pressure in lift chambers 33, 41. Such a secondary air pressure is generated by a biasing regulator 44. One example of a biasing regulator 44 is a Type 200 Precision Air Relay manufactured by ControlAir Inc.; more information can be obtained at www.controlair.com. The biasing regulator 44 is supplied with pressurized air from system 22 and may be preset by the system manufacturer, motorcycle manufacturer or in the alternative, adjusted for ride characteristics by the operator.

In the embodiment illustrated in FIG. 7D, a biasing regulator 44 is connected to lift chambers 33, 41, and is configured to deliver a secondary pressure at a pressure relative to that of lift chambers 33, 41 to rebound chambers 43, 45. Such a configuration is provided in part to offset the pressure in lift chambers 33, 41. This pressure in rebound chambers 43, 45 controls the rebound of the suspension component, and of the front or rear end of the motorcycle as a whole.

Biasing regulator 44 further provides a counterbalance to the air spring effect on an opposite side (i.e. rebound chambers 43, 45) of the piston as that of the main air suspension pressure (lift chambers 33, 41). The biasing regulator maintains a ratio or proportional counterforce to the air spring unloaded setting, and thus, provides the rebound control in a manner which tracks any changes in the main air spring pressure. Air functions as an ideal spring due to the fact that the spring rate is progressive during compression in contrast to most springs, which have a linear fixed compression rate.

Figure 3:
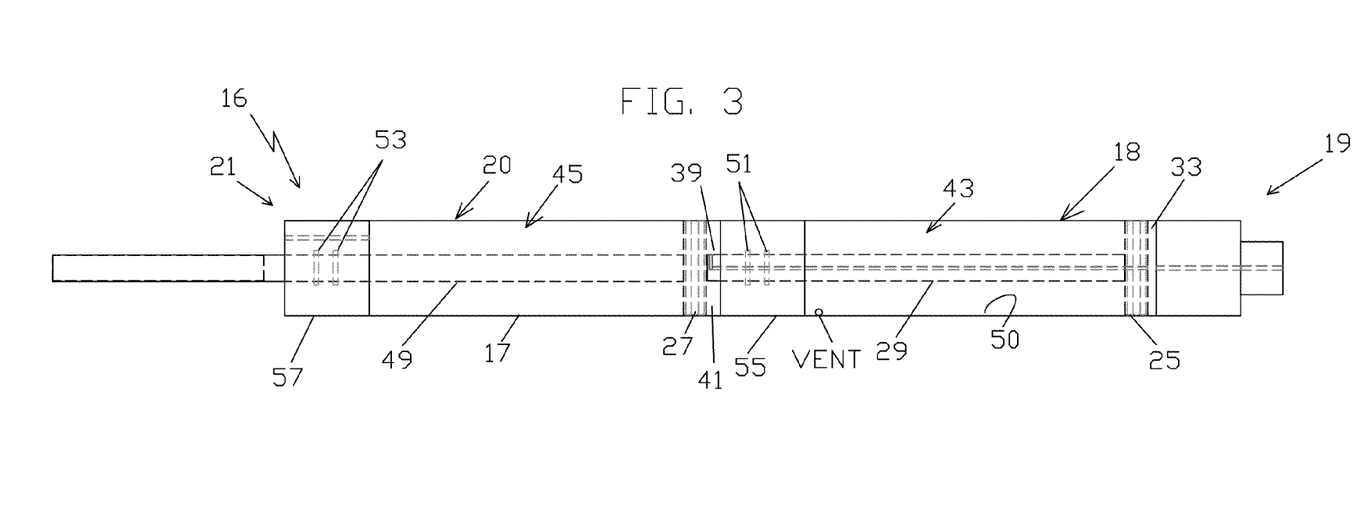
FIG. 3 is another front view of the gas suspension system of FIG. 2.
Figure 4:
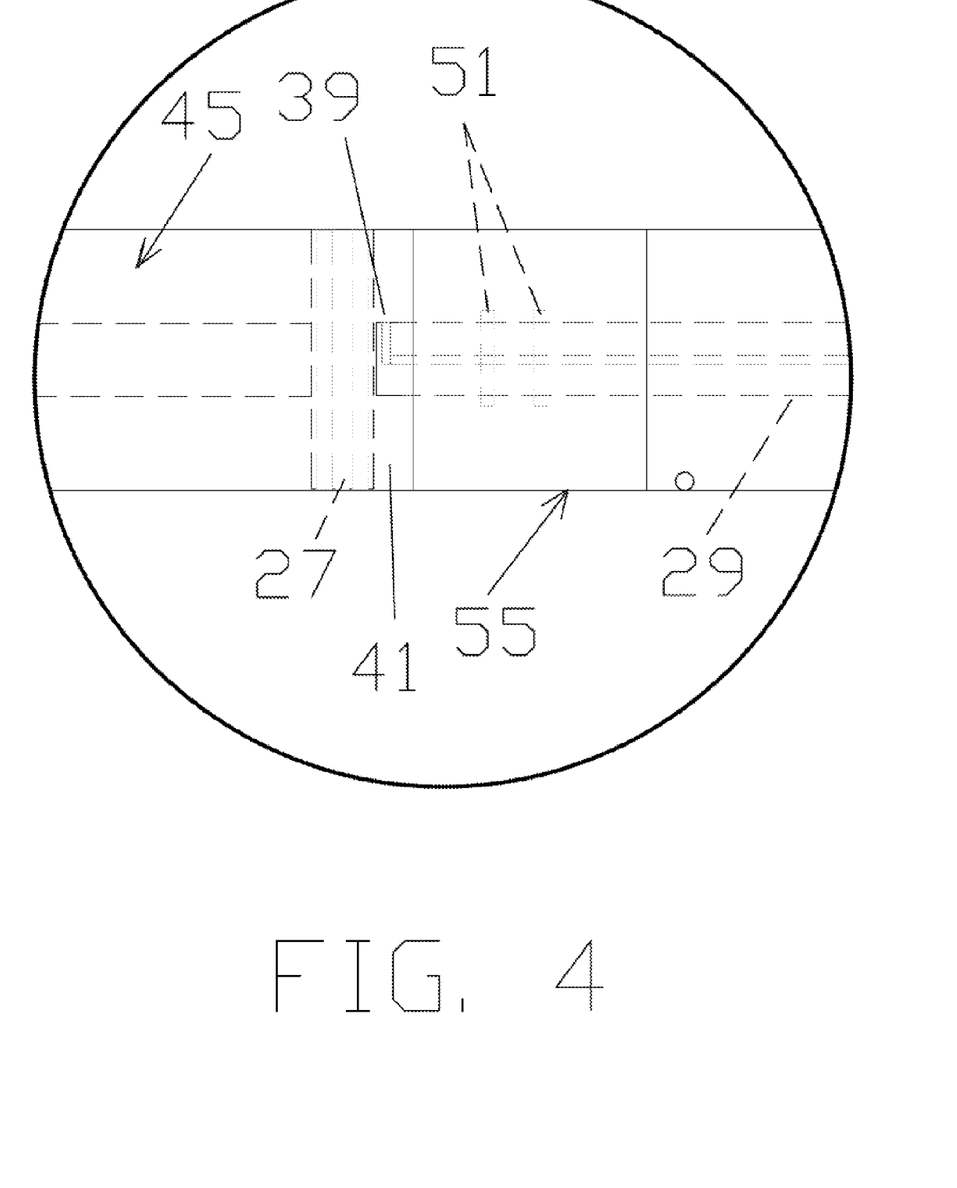
FIG. 4 is an enlarged view of a midsection of the suspension system of FIGS. 1-2.
Figure 5:
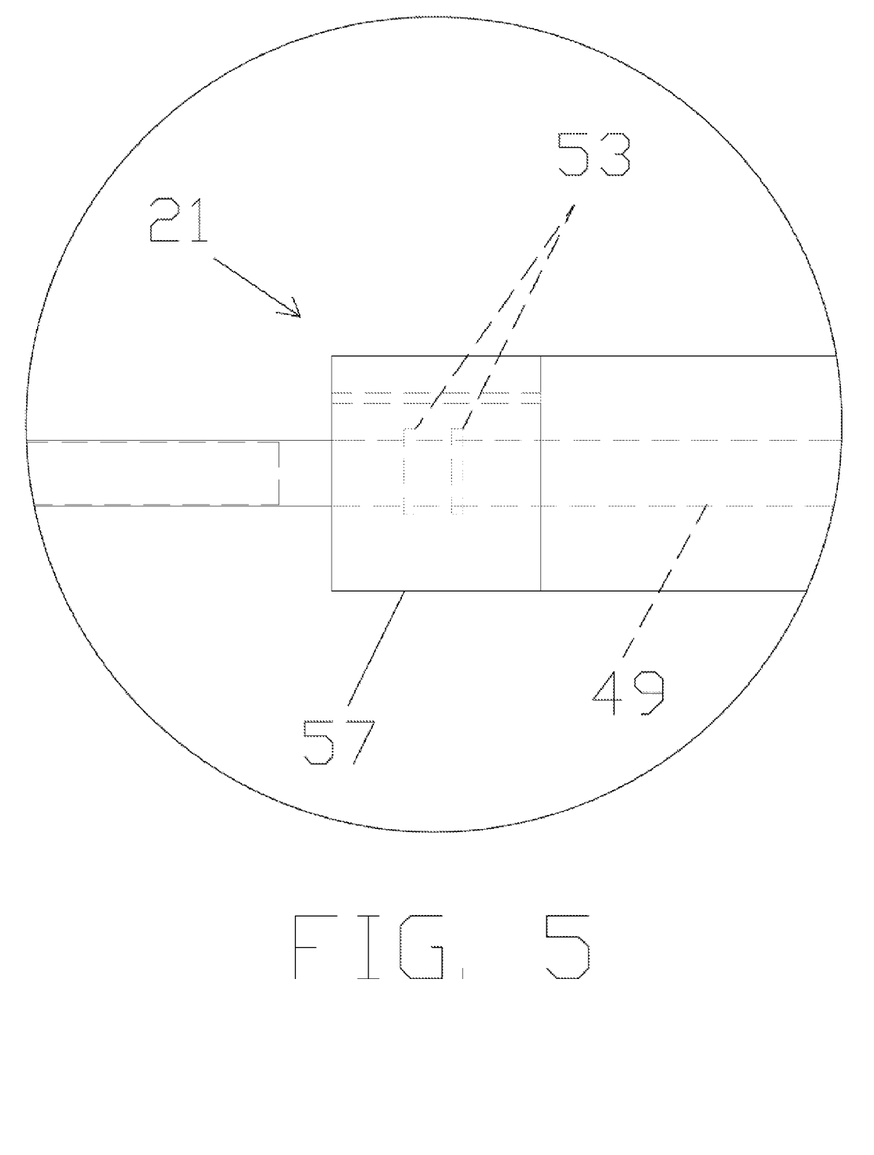
FIG. 5 is an enlarged view of a second end (end cap) of the suspension system of FIGS. 1-2.
Figure 6:
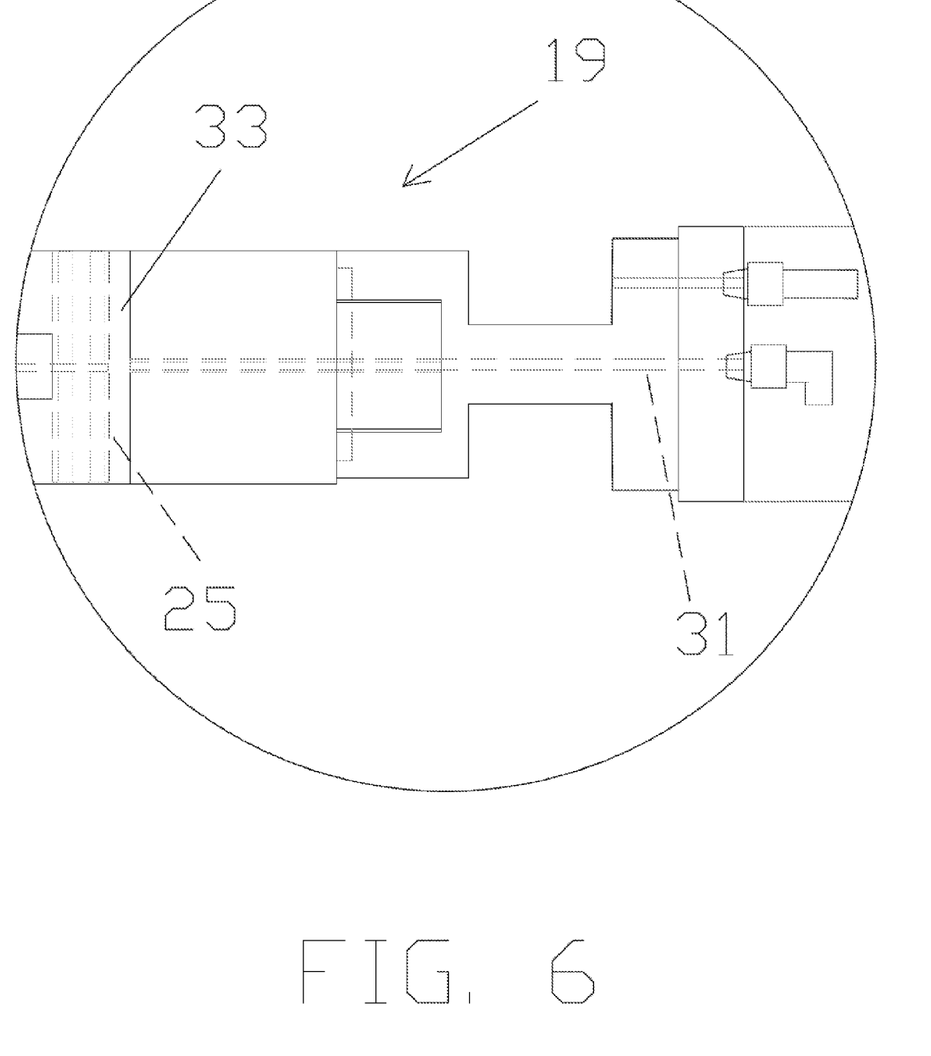
FIG. 6 is an enlarged view of a first end of the suspension system of FIGS. 1-2.

In the disclosed embodiment, first end 19 (and second end 21), shown in FIGS. 2-3, may be fitted with a self-lubricating bearing material on the bearing contact surface 50 that permits extended function. Furthermore, the tolerances for first and second ends 19, 21 may be such that the suspension component 18 may be installed on a variety of motorcycles and even on frames having slight offsets or imperfections. Moreover, due to the small size of suspension component 16 (less than the diameter of a standard monoshock 3.25" and the same overall length), the presently disclosed system may be substituted for nearly any existing suspension component.

In the disclosed embodiment, a pair of suspension components 16 may be sold as a kit that can be retrofitted on a sport bike having the manufacturer's OEM standard monoshock (also referred to as a fork tube). The kit may include all of the pneumatic components described herein and illustrated in FIG. 7, including push buttons 40. The kit may also include instructions for installation. The kit may or may not include a biasing regulator, since such an addition would be an additional cost for the consumer. In the non-biasing regulator kit, other embodiments discussed herein could be sold as a kit, e.g. the embodiment in which chambers 43, 45 are pre-pressurized prior to delivery of the kit. The kit may also include a volume chamber and/or a compressor that is installable on the motorcycle. The kit may be combined with a rear pneumatic suspension system for a motorcycle as well.

An exemplary installation process may include the following steps. The lower shock retainer bolts, near the axle, are removed. The threaded caps of the existing OEM standard shock are unscrewed and the internal components of the OEM shock are removed from the housing. A suspension component 16, shown in FIGS. 2-3, is inserted in the place of each the internal suspension components of the OEM standard shock, and the appropriate pneumatic connections made to a volume chamber, a compressor, buttons 40, or otherwise, depending on the particular kit purchased. A decorative cap 60, visible in FIG. 2, may be provided for covering the pneumatic fittings of suspension component 16.

While the disclosure is susceptible to various modifications and alternative forms, specific exemplary embodiments thereof have been shown by way of example in the drawings and have herein been described in detail. It should be understood, however, that there is no intent to limit the disclosure to the particular embodiments disclosed, but on the contrary, the intention is to cover all modifications, equivalents, and alternatives falling within the spirit and scope of the disclosure and as further defined by the following claims.

What is claimed is:

1. A kit comprising:
   a pair of pneumatic suspension components configured to be positioned within two fork tubes in a front-end motorcycle suspension system, each of the pneumatic suspension components defining a single body housing having two pneumatic cylinders in axial alignment therein,
   wherein each of the pneumatic suspension components includes a rebound chamber.

2. The kit of claim 1, wherein the rebound chamber acts as a biasing element.

3. The kit of claim 1, wherein the pair of suspension components are in pneumatic communication with each other.

4. The kit of claim 1, wherein each of the pneumatic cylinders defines a lift chamber, and the two lift chambers in each suspension component are in pneumatic communication with each other.

5. The kit of claim 4, wherein the two lift chambers communicate via an internal port disposed inside a piston rod.

6. The kit of claim 4, wherein each lift chamber is in communication with a compressed air source.

7. The kit of claim 1, further comprising a check valve coupled to one of the rebound chambers, the check valve permitting the intake of ambient air into the rebound chamber.

8. The kit of claim 7, wherein the second chamber is pre-pressurized to a predetermined pressure.

9. The kit of claim 8, wherein the predetermined pressure is above zero and below fifty pounds per square inch.

10. The kit of claim 1, further comprising a biasing regulator that maintains the pneumatic pressure of a first cylinder chamber as a ratio of the pneumatic pressure of a second cylinder chamber.

11. The kit of claim 10, wherein the biasing regulator is adjustable.

12. A kit comprising:
   a pneumatic suspension component configured to be positioned within a front-end motorcycle fork tube, the pneumatic suspension component defining a single housing having two pneumatic cylinders in axial alignment therein, wherein at least one of the cylinders is double acting.

13. The kit of claim 12, wherein each of the pneumatic cylinders defines a lift chamber, and the two lift chambers are in pneumatic communication with each other.

14. The kit of claim 13, wherein the lift chambers communicate via an internal port disposed inside a piston rod.

15. The kit of claim 13, wherein the lift chambers are in communication with a compressed air source.

16. The kit of claim 12, wherein the pneumatic suspension component defines a rebound chamber.

17. The kit of claim 16, further comprising a piston located inside one of the cylinders, wherein the rebound chamber exerts a bias against the piston.

18. The kit of claim 16, further comprising a check valve coupled to one of the rebound chambers, the check valve permitting the intake of ambient air into the rebound chamber.

19. The kit of claim 16, further comprising a biasing regulator that maintains the pneumatic pressure of the rebound chamber as a ratio of the pneumatic pressure of a lift chamber in the pneumatic suspension component.

20. The kit of claim 19, wherein the biasing regulator is adjustable.

* * * * *